(No Model.)

W. KIMMEL.
GANG PLOW CANTING DEVICE.

No. 300,614. Patented June 17, 1884.

WITNESSES:
Thos. Houghton.
W. X. Stevens.

INVENTOR:
Wm. Kimmel.
BY Munn & Co.
ATTORNEYS.

UNITED STATES PATENT OFFICE.

WILLIAM KIMMEL, OF MILTON, INDIANA.

GANG-PLOW CANTING DEVICE.

SPECIFICATION forming part of Letters Patent No. 300,614, dated June 17, 1884.

Application filed November 26, 1883. (No model.)

*To all whom it may concern:*

Be it known that I, WILLIAM KIMMEL, a citizen of the United States, residing at Milton, in the county of Wayne and State of Indiana, have invented certain new and useful Improvements in Gang-Plow Canting Devices, of which the following is a description.

This invention relates to that class of plows in which a number of plows are attached to a common draft-bar each by independent means; and it has for its object to provide means whereby each plow may be canted to the right or left from a vertical position, and whereby all the plows may be elevated from the ground.

To this end my invention consists in the construction and combination of parts forming a gang-plow canting device, hereinafter described and claimed, reference being had to the accompanying drawings, in which—

Figure 1:
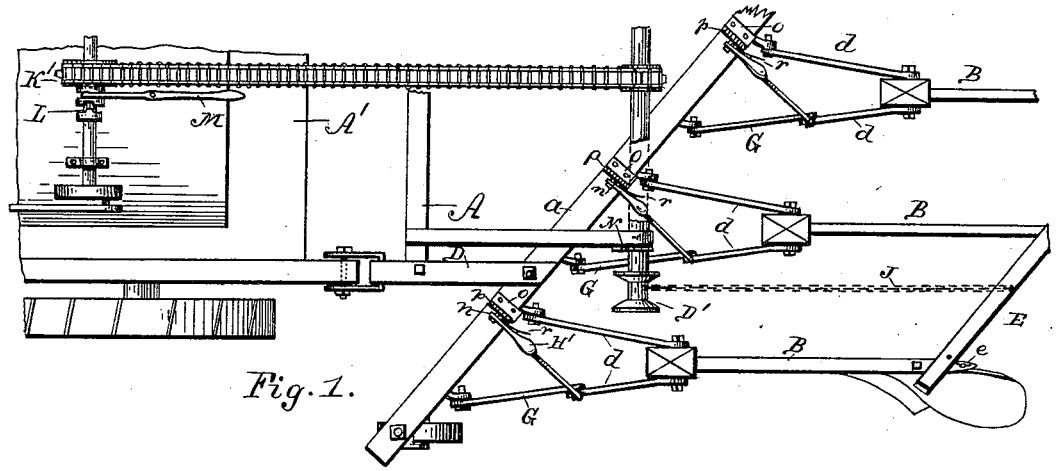
Figure 2:
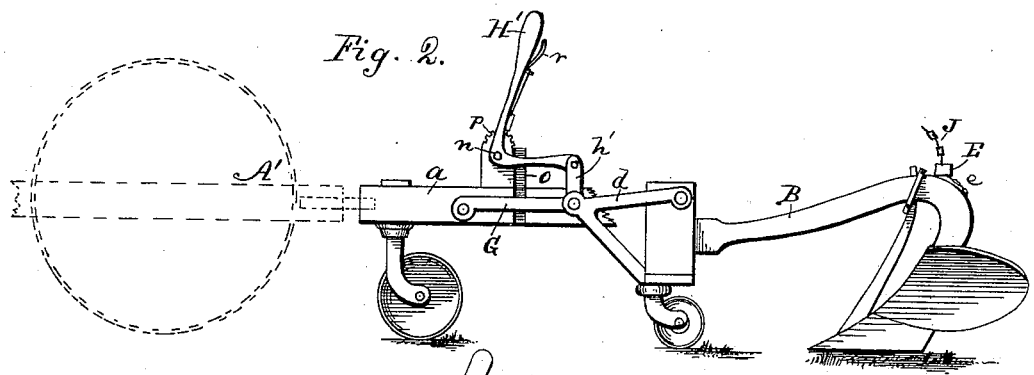
Figure 3:
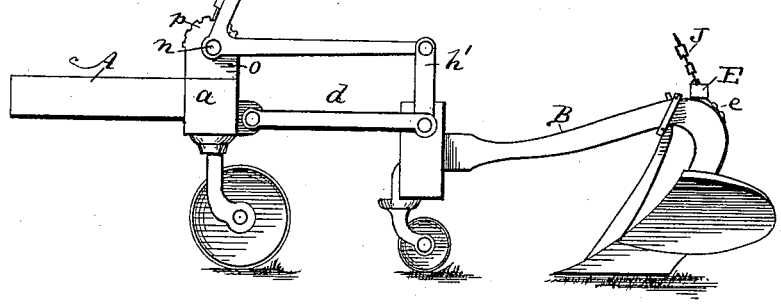

Figure 1 is a plan view of a portion of a gang of plows, showing my invention. Fig. 2 is a transverse vertical section at $x$ of Fig. 1, showing my invention attached to one plow of a gang; and Fig. 3 is a detail view in side elevation.

Let A represent a truck supported upon wheels wholly independent of the plows, to be hauled by a team, a traction-engine, or other motive power.

B B represent plow-beams, each provided with two independent bails or hitches, $d$, to attach them to the truck A. In case the rear or plow-hitching beam, $a$, of the truck is set diagonal to the line of travel of the plows, as here shown, one of the bails $d$ of each plow is provided with a link, G, to reach beam $a$, and my present canting device is connected to the joint of bail $d$ and link G by means of a rod, $h'$.

The canting device consists of a lever, H', pivoted at $n$ to a bracket, $o$, which is rigidly secured to the beam $a$ of the truck. $p$ is a toothed arc fixed to or a part of said bracket $o$ concentric with pivot $n$. $r$ is a spring-latch on lever H', adapted to engage the teeth of arc $p$ to hold said lever H' at any desired point. In case the hitch-beam of truck A is at right angles to the line of travel, the two bails $d$ will each be hitched directly thereto without the mediation of link G. In that case the rod $h'$ will be connected with the plow at the rear end of one of the bails $d$, as shown in Fig. 3. By means of this canting device the operator may quickly set each plow in any desired relation to the others. This method of canting a plow from the vertical plane of the line of travel also effects the desired point of causing the plow to take a little different path relative to the width of the truck by acting to change the distance between the side of the plow operated on and the truck, thus turning the beam of the plow a little diagonally.

To each plow-beam B a rope, $e$, is attached, connecting with a cross-bar, E, which is supported by two chains, J, running over pulleys D', mounted on braces D of the truck A. The chains J are wound upon a roller, J', journaled on the engine, and revolved by the engine by means of the chain belt K', running on the sprocket-wheels K and K'', the former being on roller J', and the latter being on the main shaft of the engine. The engine-shaft usually runs freely in the wheel K'', and is connected therewith, whenever it is desired to raise the plows, by any usual means—such as by the clutch L and lever M—and the plows are held elevated, after the clutch is disengaged, by any usual device, such as the toothed wheel and detent N.

Having thus fully described my invention, what I claim, and wish to secure by Letters Patent, is—

The combination, with a truck mounted on wheels, of one or more plows, each having two independent hitching-rods to connect it with said truck, a lever pivoted to said truck above one of said rods and connected therewith by a link, a toothed segment fixed concentric with said pivot, and a latch upon said lever, whereby said rod may be quickly raised or lowered, and then held to cant the plow, substantially as described.

WILLIAM KIMMEL.

Witnesses:
GEO. H. ORR,
DANIEL KIMMEL.